(No Model.)
T. HIPWELL.
LAMP BURNER.
No. 302,658. Patented July 29, 1884.
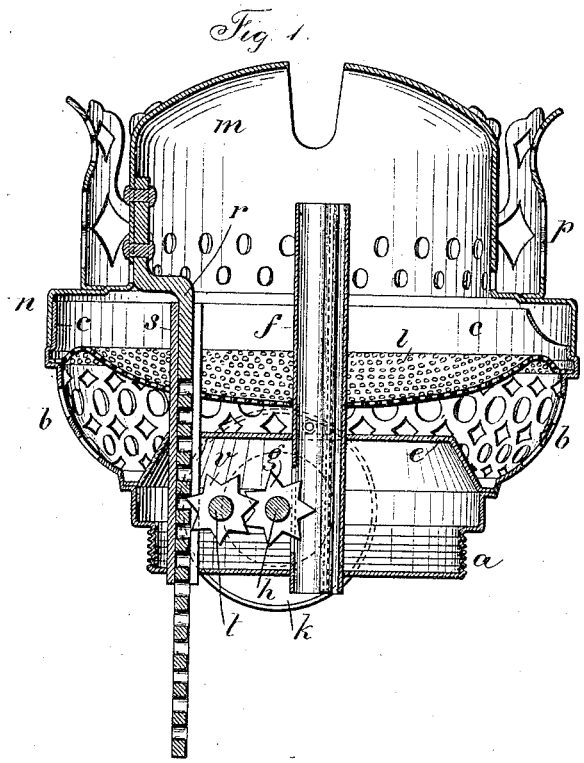
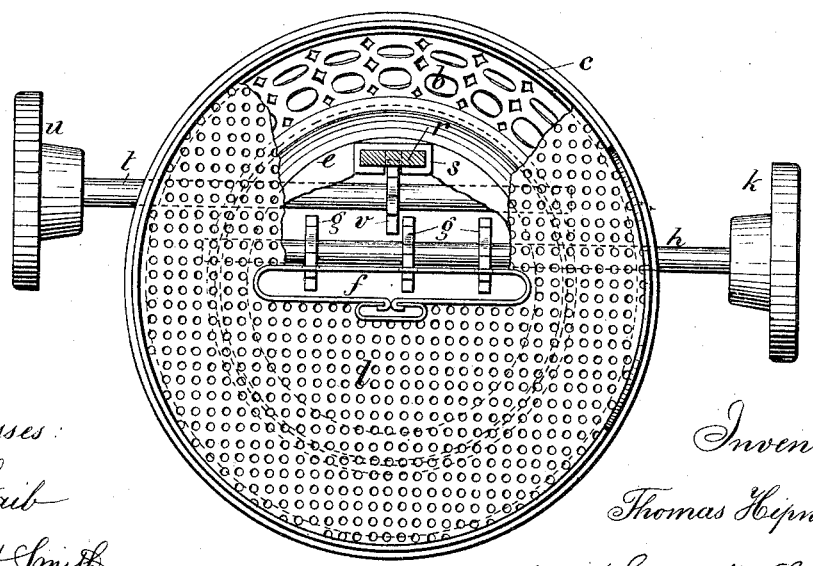
Witnesses:
J. Staib
Chas. H. Smith
Inventor:
Thomas Hipwell
per Lemuel W. Serrell
atty

United States Patent Office.

THOMAS HIPWELL, OF ASTORIA, ASSIGNOR TO THE MANHATTAN BRASS COMPANY, OF NEW YORK, N. Y.

LAMP-BURNER.

SPECIFICATION forming part of Letters Patent No. 302,658, dated July 29, 1884.

Application filed February 11, 1884. (No model.)

*To all whom it may concern:*

Be it known that I, THOMAS HIPWELL, of Astoria, in the county of Queens and State of New York, have invented an Improvement in Lamp-Burners, of which the following is a specification.

Lamp-burners have been made so that the chimney can be raised or the wick-tube lowered for the purpose of giving access to the wick for lighting or trimming.

My invention is especially available with large burners in which the chimney is heavy and cumbersome to handle, and in which the burner requires to be kept thoroughly clean and the wick trimmed with care to prevent smoking. I make use of an ordinary wick-tube and wick-raiser, and surround the base of the burner with a perforated body, and introduce an air-distributer of finely-perforated sheet metal within the body and around the wick-tube, and to the air-deflector and chimney-holder there is a rack-bar fastened, which passes vertically down through a tubular slide that is fastened in the body of the burner, and there is a thumb-wheel, shaft, and pinion in the base of the burner, by which the chimney-holder and deflector are raised by one hand while the wick is raised or adjusted by the other hand. This gives opportunity for properly regulating the flame, even while the lamp is burning, and the chimney-holder and deflector can be removed or replaced with facility while the lamp is burning.

In the drawings, Figure 1 is a vertical section, and Fig. 2 is a plan partially in section below the chimney-holder.

The body of the burner is composed of the screw $a$, perforated base $b$, and cylindrical rest $c$. Within the base is the ratchet-cap $e$, and $f$ is the wick-tube; $g$, the wick-raising wheels; $h$, the shaft, and $k$ the thumb-wheel, to actuate the wick-raiser. When there are two wicks side by side, there are to be two sets of wick-raisers, one for each wick, with separate thumb-wheels or with gearing connecting the two shafts together. The perforated plate $l$ forms the air-distributer. The same is within the cylindrical rest $c$ and around the wick-tube $f$. The deflector $m$ has a flame-slot, as usual; or there may be two slots in cases where there are two wicks. This deflector has a base that forms a chimney-rest, and a cylindrical skirt, $n$, that surrounds the rest $c$. The spring chimney-holder $p$ surrounds the deflector, and is attached to the base of the same. The rack $r$ is riveted at its upper end into the inside of the deflector $m$, and it is provided with a row of holes in the vertical portion, and it passes through the stationary tube $s$, that passes up through the ratchet-cap and through the air-distributer. Within the base of the lamp there is a shaft, $t$, with a thumb-wheel, $u$, upon the outer end, and a pinion, $v$, with pointed teeth passing into the holes in the rack. By this means the rack, the deflector, and the chimney and chimney-holder can be easily raised or lowered for trimming or lighting, the thumb-wheel $u$ being operated by one hand and the wick-raiser by the other hand.

I do not claim a circular wick-tube and a chimney-holder surrounding the same, with a connected rack and a pinion for raising and lowering the chimney-holder.

I claim as my invention—

The combination, in a lamp-burner, of the flat-wick tube $f$, the screw $a$, perforated base $b$, and flaring cylindrical rest $c$, the perforated air-distributer within the rest $c$ and around the wick-tube, the deflector and chimney-holder, and a skirt surrounding the rest $c$, the rack connected to the deflector, and the stationary guide for the same, and the pinion and thumb-wheel, substantially as set forth.

Signed by me this 6th day of February, A. D. 1884.

THOMAS HIPWELL.

Witnesses:
JOHN E. DOOLEY,
FRED RICHARD.